United States Patent
Bills et al.

(10) Patent No.: US 6,714,951 B2
(45) Date of Patent: Mar. 30, 2004

(54) CONTINUOUS JOURNALING OF OBJECTS WITHIN A HIERARCHICAL DIRECTORY TREE

(75) Inventors: Raymond Allen Bills, Rochester, MN (US); Jerry Leroy Von Berge, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 345 days.

(21) Appl. No.: 09/835,912

(22) Filed: Apr. 16, 2001

(65) Prior Publication Data

US 2002/0152195 A1 Oct. 17, 2002

(51) Int. Cl.[7] ............................................. G06F 17/30
(52) U.S. Cl. ..................... 707/202; 707/1; 707/200; 714/1
(58) Field of Search ................ 707/1–10, 100–102, 707/200–206; 714/1, 2, 15, 19

(56) References Cited

U.S. PATENT DOCUMENTS

| | | | |
|---|---|---|---|
| 5,903,898 A | * | 5/1999 | Cohen et al. ............... 707/204 |
| 6,018,741 A | * | 1/2000 | Howland et al. ........... 707/102 |
| 6,189,016 B1 | * | 2/2001 | Cabrera et al. ............. 707/203 |
| 6,341,291 B1 | * | 1/2002 | Bentley et al. ............. 707/203 |

* cited by examiner

*Primary Examiner*—Kim Vu
*Assistant Examiner*—Joon Hwan Hwang
(74) *Attorney, Agent, or Firm*—Moser Patterson & Sheridan, LLP

(57) ABSTRACT

A system and method for automatic journaling of objects in a computer file system. A journal directory operation is caused when a new or existing object to be linked into a directory if the directory has an attribute indicating automatic journaling status. An operating system synchronization lock is acquired before the object is journaled to preserve the object from changes by the operating system, and held in place until after journaling has started.

20 Claims, 5 Drawing Sheets

| OBJECT TYPE | NAME | JOURNALING ATTRIBUTE | X | |
|---|---|---|---|---|
| FILE | FILE1 | YES | | 61-0 |
| DIRECTORY | DIR1 | YES | | 61-1 |
| DIRECTORY | DIR3 | | | 61-2 |
| DATA LINK | DATA1 | YES | | 61-3 |
| • • • | | | | |
| DIRECTORY | DIR2 | YES | | 61-n |

Columns: 62-0, 62-1, 62-2, 62-n; Table 60

| OBJECT TYPE | NAME | JOURNALING ATTRIBUTE | X | |
|---|---|---|---|---|
| FILE | FILE1 | YES | | 61-0 |
| DIRECTORY | DIR1 | YES | | 61-1 |
| DIRECTORY | DIR3 | | | 61-2 |
| DATA LINK | DATA1 | YES | | 61-3 |
| ⋮ | ⋮ | ⋮ | | |
| DIRECTORY | DIR2 | YES | | 61-n |

CONTINUOUS JOURNALING OF OBJECTS WITHIN A HIERARCHICAL DIRECTORY TREE

BACKGROUND OF THE INVENTION

1. Field of the Invention

This invention relates to journaled file systems in digital computers and more specifically to automatic journaling of objects in a file system.

2. Background of the Related Art

A digital storage device in a computer system stores the operating system software, user applications and data files. One function of the operating system is to administer data storage in the storage device. A sub-system of the operating system, namely the file system, administers data storage in the storage device by allocating data to files and directories in response to appropriate requests by a system user or by an application.

Over time, files and directories are modified in different manners. For example, directories are created and named. Files are generated and deleted and the data in a file or in one of its attributes is modified. A link from a file or a directory to an existing directory or file may be added. To maintain a history of what activity has taken place within a digital storage device, a sub-system of the file system, namely the journal file system, keeps a current record, or journal, of directories and their contents.

A journal file system (JFS) is a file system in which the digital storage device maintains data integrity in the event of an operating system crash or if the operating system is otherwise halted abnormally. The JFS maintains a journal (also known as a journal receiver) of what activity has taken place within the data area of the digital storage device, and if a system crash occurs, any lost data can be reconstructed from the information contained in the journal.

A JFS provides a facility to track detailed information about file system object changes and provides protection against partial changes being made to an object at the point of an abnormal system termination. An object, as used herein, is a named storage space in a file system, that consists of a set of characteristics that describe itself and in some cases data. Some examples of objects are directories, programs, files, libraries and folders.

In general, there are three primary areas of support from a JFS when an object is journaled. These areas of support are: (i) recording changes to objects, (ii) single system recovery, and (iii) recovery of a saved object to a known state. These areas are discussed below.

In a recording of changes to objects, object changes are recorded as journal entries in a journal receiver. The journal receiver is a file object that contains journal entries added by the operating system when files or directories are modified. As an example, directories are created and renamed or files are created and the data in a file or in one of its attributes has been modified. The journal entries may then be used for recovery from an abnormal system termination. Another use for the recorded changes is for replicating entries from the journal receiver to a back-up system so that they can be retrieved to create and maintain a replica of the source file system.

Single system recovery occurs during an initial program load (IPL) following an abnormal system termination. The journal receiver serves as a basis for all changes to objects that are implemented by an IPL. The IPL then processes object changes as if the abnormal system termination had not occurred by using the data contained in the receiver log that was created before the system termination. Damaged objects, caused by system functions that were interrupted during their critical operations, are discarded.

Recovery of a saved object to a known state is typically a system administrator-initiated recovery that provides a mechanism to recover a saved object to a specific state. The object is recovered to a state of its last saved operation occurring sometime prior to the operation that caused the object to become corrupted. A user initiated save command, though it could also be performed automatically by an application when the application is closed, typically performs a last saved operation. When an object is saved, a journal entry of the object is stored in the journal receiver.

Conventionally, when an object is created, an explicit start journaling operation is required to create a journal entry for the object. An explicit start operation is an operation that requires intervention by a system user in the form of a keystroke command or by the selection of an icon on a graphical user interface (GUI). When an explicit start journaling operation is executed immediately after an object is created, there is an indeterminate period of time, or open window, when the newly created object is exposed to changes from other tasks being performed on the system. This means that, in the absence of any additional mechanism in the journaling operation, the new object is exposed to undesirable changes by the operating system that do not have corresponding entries in the journal.

As an illustration of one of the deficiencies in the conventional method, during the open window there could be a system user completing a transaction that results in a new file object being created. The file object contains details of a user transaction generated by an open application. In some cases, the details of the transaction could potentially become lost. This is because, in the open window, the system may have halted without any forewarning. The application processing the transaction may have received confirmation from the operating system that the file was successfully written to the data storage device, though it was actually never written. Since the object was not journaled at a time prior to the system halt and the user had no time to explicitly invoke journaling on the transaction details, the details of the transaction are lost.

Therefore, there is a need for a journal file system that will automatically journal objects in an operating system file system when the objects are created. There is also a need for a journal file system that preserves the state of an object while the object is being journaled.

SUMMARY OF THE INVENTION

Systems, methods and articles of manufacture are provided for journaling an object. In one embodiment, a method for journaling objects of a file system on a computer system comprises affecting a first object and, in response to affecting the first object, journaling the first object if the file system is configured with a journaling attribute. In one embodiment, affecting comprises at least one of creating the first object and modifying the first object. In the case of creating the first object, the first object may then be linked to an existing object of the file system. While affecting the object, an operating system of the computer system may take steps to prevent the objects of the file system from being changed.

Another embodiment provides a data structure, comprising a journaling attribute indicative of whether an object, upon being linked to the data structure, is to be journaled automatically by an operation of an operating system. Illustratively, the journaling attribute is a binary value having a first value indicating that the object is to be journaled upon being linked to the data structure and a second value indicating that the object is not to be journaled upon being linked to the data structure.

In yet another embodiment, another embodiment provides a signal bearing medium comprising a program which when executed by a processor, performs a method for journaling objects. The method comprises affecting a first object and, in response to affecting the first object, journaling the first object if the file system is configured with a journaling attribute. In one embodiment, affecting comprises at least one of creating the first object and modifying the first object. In the case of creating the first object, the first object may then be linked to an existing object of the file system. While affecting the object, the program may cause an operating system to take steps to prevent the objects of the file system from being changed.

In still another embodiment, a method of automatically journaling directory objects associated with a root directory is provided. The method comprises creating a new directory object, linking the new directory object to an existing directory object and determining whether the new directory object is to inherit a journaling attribute configured to cause automatic journaling of objects linked to the new directory object. If the new directory object is to inherit the journaling attribute, the method further comprises writing the new directory object to a log.

In still another embodiment, a method of journaling an object in a hierarchical directory tree of a file system is provided. The method comprises journaling a directory object and preventing access to the file system while journaling the directory object. Preventing access to the file system may comprise synchronizing the file system with an operating system.

BRIEF DESCRIPTION OF THE DRAWINGS

So that the manner in which the above recited features and embodiments are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
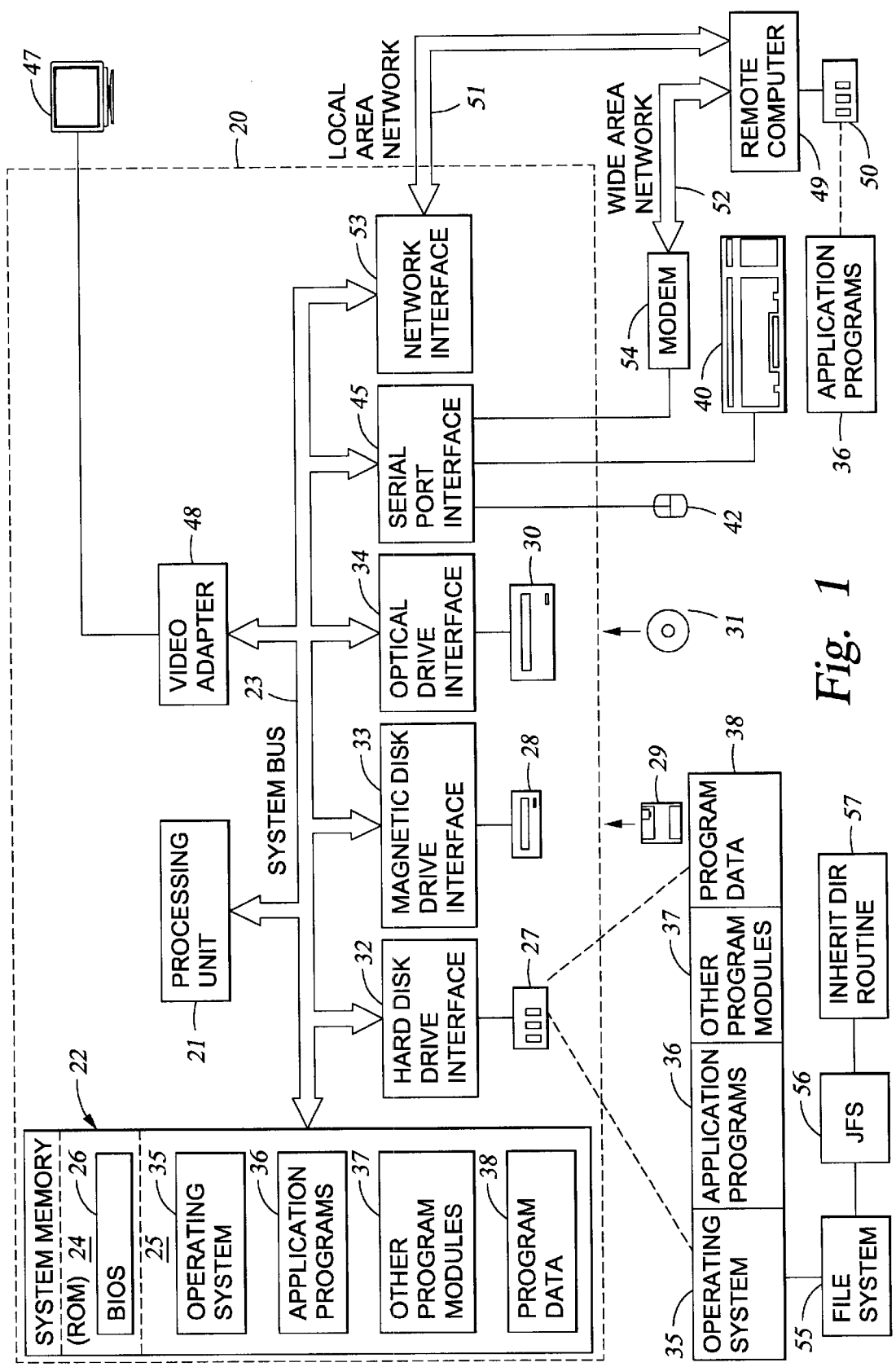
FIG. 1 shows a diagram of one embodiment of the hardware and operating system environment in conjunction with which embodiments of the invention may be practiced.

The embodiments provide a system and method for automatically journaling objects in a storage device. In one embodiment, directory objects are configured with a journaling attribute set to a predefined value. Objects that are linked to a directory object configured with the journaling attribute are journaled directly. In another embodiment, non-journaled objects that are linked to journaled objects configured with the journaling attribute inherit the journaling attribute. In yet another embodiment, objects are preserved by the file system from undesirable changes until journaling of the object is completed. As used herein, "configured" means that a structure (e.g., object data, etc.) possesses a computer readable attribute. During execution of a program, configured structures cause a computer to take predefined steps according to the characteristics of the attribute. In embodiments provided herein, an attribute configures a newly created directory object to be journaled upon linking the new object to an existing object. In other embodiments, an attribute configures an object to provide for inheritance of the attribute by other objects. A structure may be configured for automatic journaling by any means known or unknown. Illustratively, ASCII symbols are used to configure an object for automatic journaling and/or inheritance.

Although not required, one embodiment is described in the general context of computer-executable instructions, such as program modules, being executed by a computer, such as a personal computer, for example. Generally, program modules include routines, programs, objects, components, data structures, etc. that perform particular tasks or implement particular abstract data types.

The program modules that define the functions of the present embodiments may then be placed on a signal-bearing medium to provide a signal-bearing medium. The signal bearing media, include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Moreover, those skilled in the art will appreciate that embodiments may be practiced with other computer system configurations including hand-held devices, multiprocessor systems, microprocessor-based or programmable consumer electronics, network PCS, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

Hardware

FIG. 1 shows one embodiment of a computer 20. In general, the computer 20 comprises a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, a magnetic disk drive 28 for reading from and writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules and data structures may be stored on the media readable hard disk drive 27, magnetic disk drive 28, optical disk drive 30, ROM 24, or RAM 25. Illustrative programs and data structures include an operating system 35, one or more application programs 36, other program modules 37, and program data 38.

In one embodiment, the operating system 35 comprises a file system 55, a journal file system (JFS) 56, and an inherit directory routine 57. The operating system 35 administers data storage of objects on a media storage device using the file system 55. The file system 55 allocates the storage of objects to files and directories. The JFS 56, in combination with the inherit directory journal routine 57, administers journaling of objects stored by the file system 55. One embodiment of a method performed by the inherit directory journal routine 57 is described below with reference to FIG. 4.

Illustratively, the file system 55, the JFS 56 and the inherit directory journal routine 57 are part of the operating system 35. In another embodiment, however, inherit directory journal routine 57 may be a stand-alone program module included in the program modules 37.

A user may enter commands and information into the personal computer 20 through input devices such as a keyboard 40 and a pointing device 42. These and other devices are often connected to the processing unit 21 through a serial port interface 46 that is coupled to the system bus, but may be connected by other interfaces, such as a parallel port or a universal serial bus (USB). A monitor 47 or other type of display device is also connected to the system but 23 via an interface, such as a video adapter 48. In addition to the monitor, computers typically include other peripheral output such as speakers and printers.

The computer 20 may operate in a networked environment using logical connections to one or more remote computers, such as a remote computer 49. These logical connections are achieved by a communication device coupled to or part of the computer 20. The remote computer 49 may be another computer, a server, a router a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wise computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Figures 2, 3:
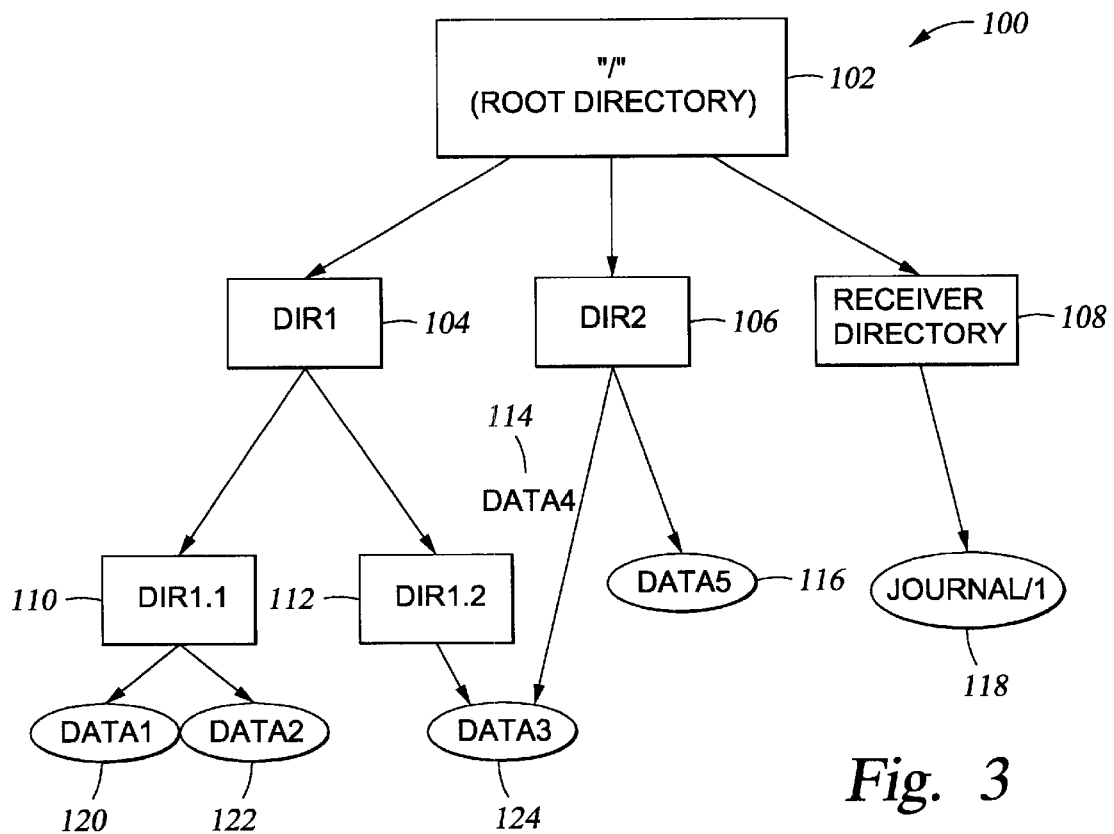
FIG. 2 illustrates the structure of one example embodiment of log entries in a journal indicating journaling attribute.
FIG. 3 illustrates a block diagram of a hierarchical file system tree.

FIG. 2 illustrates an embodiment of a journal log 60 that is a part of the JFS 56. In general, the journal log 60 comprises a plurality of journal records 61 itemized as 61-0 to 61-n.

Each journal record 61 comprises a plurality of fields, itemized as 62-0 to 62-n. Illustratively, each record is shown with a header indicating object type 62-0, object name 62-1, and a journaling attribute 62-2. The object type 62-0 is a descriptor used to indicate the type of object contained in the journal record 61. Examples of objects that may be contained in journal record 61 are directory objects, file objects and data objects. The object name 62-1 is an arbitrary descriptor identifying the object with, for example, a unique ASCII designation. Other fields that may be included in the journal record could specify the length of the record 61, one or more recorded version numbers, a time stamp, the security descriptor assigned to the file, file attributes and the length in bytes of the name of the file. It is noted that this is only one example of a journal record and that many other record formats are suitable for achieving the functions provided herein.

Generally, the journaling attribute 62-2 is configured to indicate whether a journal record 61 should be journaled upon the occurrence a predefined event affecting an object. In one embodiment, the journaling attribute 62-2 takes the form of an ASCII symbol such as the letter "Y" indicating that the journal record shall be automatically journaled. In another embodiment, the attribute may be a single digital bit where a digital "1" would indicate automatic journal status for that record. More generally, the attribute indicating journaling attribute 62-2 may be any type of computer readable indicator or flag.

In one embodiment, the aforementioned "predefined event(s) affecting an object" includes creating a new object, linking a newly created object to an existing object and modifying an object. If, for example, a journal record 61 is configured with journaling attribute 62 (e.g., the value of the journaling attribute 62-2 is set to a "Y" or "1"), the file system will automatically administer a journal operation if any newly created object is linked to the object of journal record 61.

If an existing object in the file system 55 is configured with the journaling attribute 62, that object will be automatically journaled by the JFS whenever that object is modified in any way. As an illustration, existing objects are modified when they are given a new object name 62-1, when data is changed or added to a data object, or when a new link to the existing object is created. In one embodiment, the file system will automatically administer a journal operation if an existing object is configured with a journaling attribute 62 and it is linked to another existing object (e.g., file or directory) that is not appended with journaling attribute 62. In this case, both the object configured with the attribute and the object not configured with the attribute may be journaled. Alternatively, only the object configured with the attribute may be journaled.

In another embodiment, objects may inherit a journaling attribute. Specifically, when a link is created from an object not configured with a journaling attribute 62 to an object configured with journaling attribute 62, the non-configured object will then be configured with the journaling attribute 62. Automatic journaling and journal status inheritance may be illustrated with reference to FIG. 3.

FIG. 3 illustrates an example of a hierarchical file system 100 depicting a block diagram view of a file tree structure contained in file system 55. In general, the hierarchical file system 100 comprises root directory 102, sub-directories 104, 106, and 108 flowing from root directory 102, and data files 116, 118, 120, 122 and 124. Root directory 102 of file system 100 is denoted by the forward slash symbol "/".

Directory objects dir1 104 and dir2 106 are shown linked directly below root directory 102. Also linked beneath root directory 102 is receiver directory 108. The receiver directory 108 is a directory object that contains a plurality of journal receiver file objects. Illustratively, a single journal receiver file object Journal/1 118 is shown linked below the receiver directory 108. The journal receiver file object Journal/1 118 is used to receive and log journal records from the JFS 56. The records contain information relating to the current state of a journaled object as shown in FIG. 2.

Each of the directories 104 and 106 may be linked to sub-directories or to data files. Illustratively, sub-directory dir1.1 110 links directly below dir1 104 and data files data 1 120 and data2 122 link below sub-directory dir1.1 110. Data file dat3 124 links below sub-directory dir1.2 112.

Linking directly below dir2 106 is data file data5 116 and data file data3 124. According to the illustration, there are two available paths to reach data file data3 124 from the root directory. Those paths are from dir2 106 and from dir1.2 112.

Figure 4A:
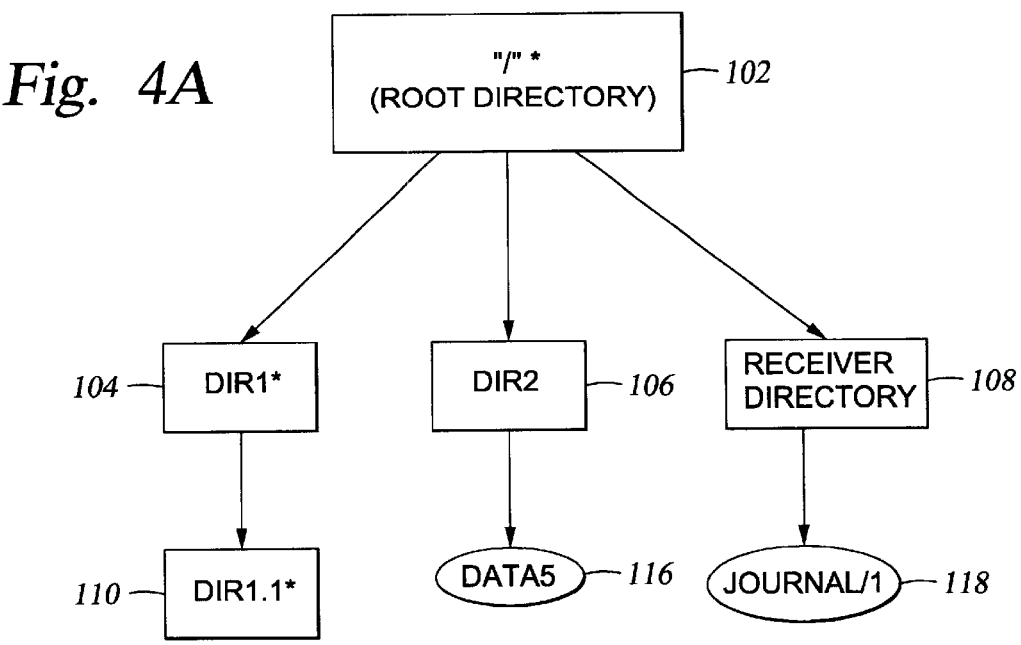
FIG. 4A illustrates a block diagram of inheritance of journal status by a newly created object in a hierarchical file system tree.

FIG. 4A illustrates an example of automatic journaling and inheritance of the journal status by newly created objects in the context of the hierarchical file system 100. For purposes of illustration, assume that no objects are initially linked below directory dir1 104 and that the root directory 102 and dir1 104 are appended with inherit journaling status 62 attribute, denoted by the asterisk symbol "*". When sub-directory object dir1.1 110 is created, that directory is automatically journaled by the JFS 56 during its creation. This is because this sub-directory flows from a root directory that already is configured with the journaling attribute 62 attribute. Thus, any directory that is created or linked to a root directory that is configured with the inherit journaling status 62 will be automatically journaled. In addition, the newly created sub-directory object dir1.1 110 may inherit the journaling attribute (as indicated by the asterisk), such that any objects linked to sub-directory object dir1.1 110 will also be journaled.

Figure 4B:
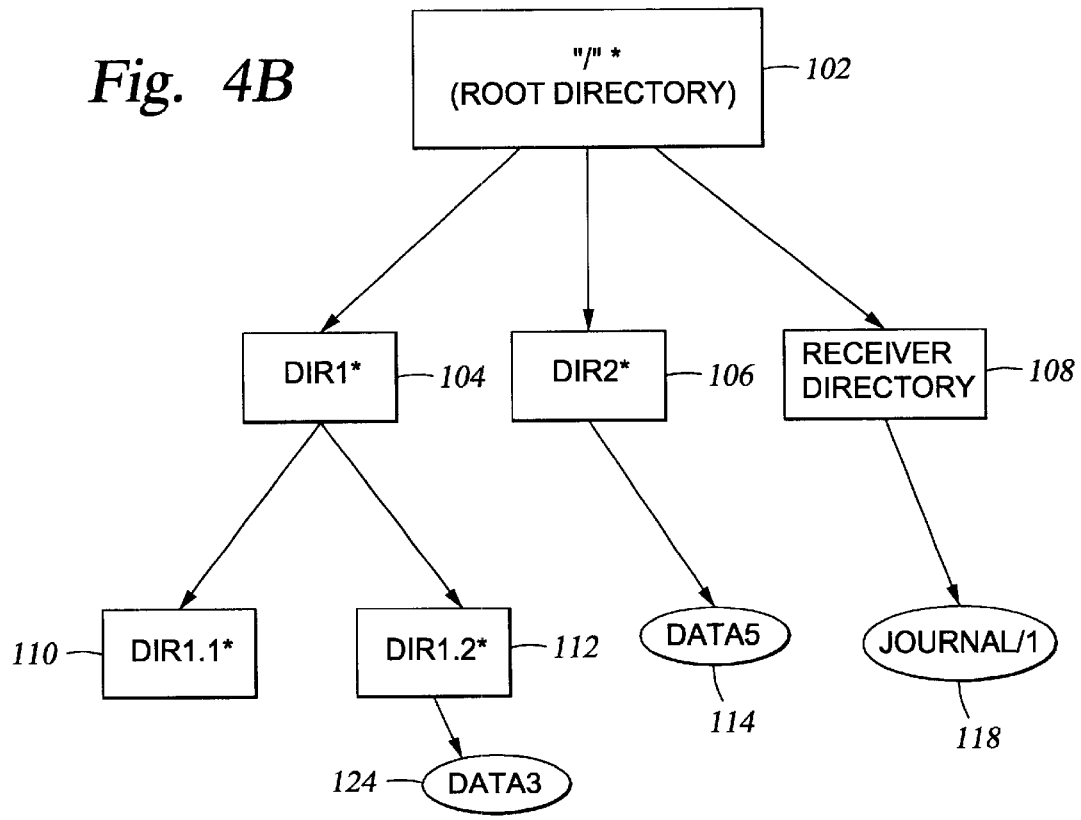
FIG. 4B illustrates a block diagram of inheritance of journal status by a newly created link in a hierarchical file system tree.

FIG. 4B illustrates an example of automatic journaling by newly created data file objects. For purposes of illustration, assume that dir1 104, dir2 106, and dir1.2 112 exist. Each of dir1 104, dir2 106, dir1.2 112 is configured with the journaling attribute, denoted by the asterisk symbol "*". When data file data3 124 is linked to directory dir1 104, data3 124 will automatically get journaled. This occurs because data file data3 124 is linked to a directory with the inherit journal status 62. However since data3 124 is a data file object at the lowest level in the tree structure, data3 124 may not inherit the journal attribute. Likewise, when data5 114 is linked to dir2 106 data5 114 will automatically get journaled. This example illustrates that inherit journaling propagates to newly created objects throughout the hierarchical file system tree structure when the root directory is configured with the journaling attribute.

During the journaling process, it is desirable to prevent changes to objects. Accordingly, in one embodiment, the operating system synchronizes its operation with the file system while journaling is processing. Synchronization is a method known in the art whereby the timing of the processing unit within a computer system matches, or synchronizes in time, the timing of its system with another computer system or sub-system.

The effect of synchronization on the journaling process is that a write lock exists on all of the linked directories while the journaling operation is processing. The write lock keeps the operating system from entering or changing data in any of the linked directories. This preserves the contents of the directories from any undesirable changes being made before journaling is started.

Automatic Journaling in Response to Affecting an Object

Figure 5:
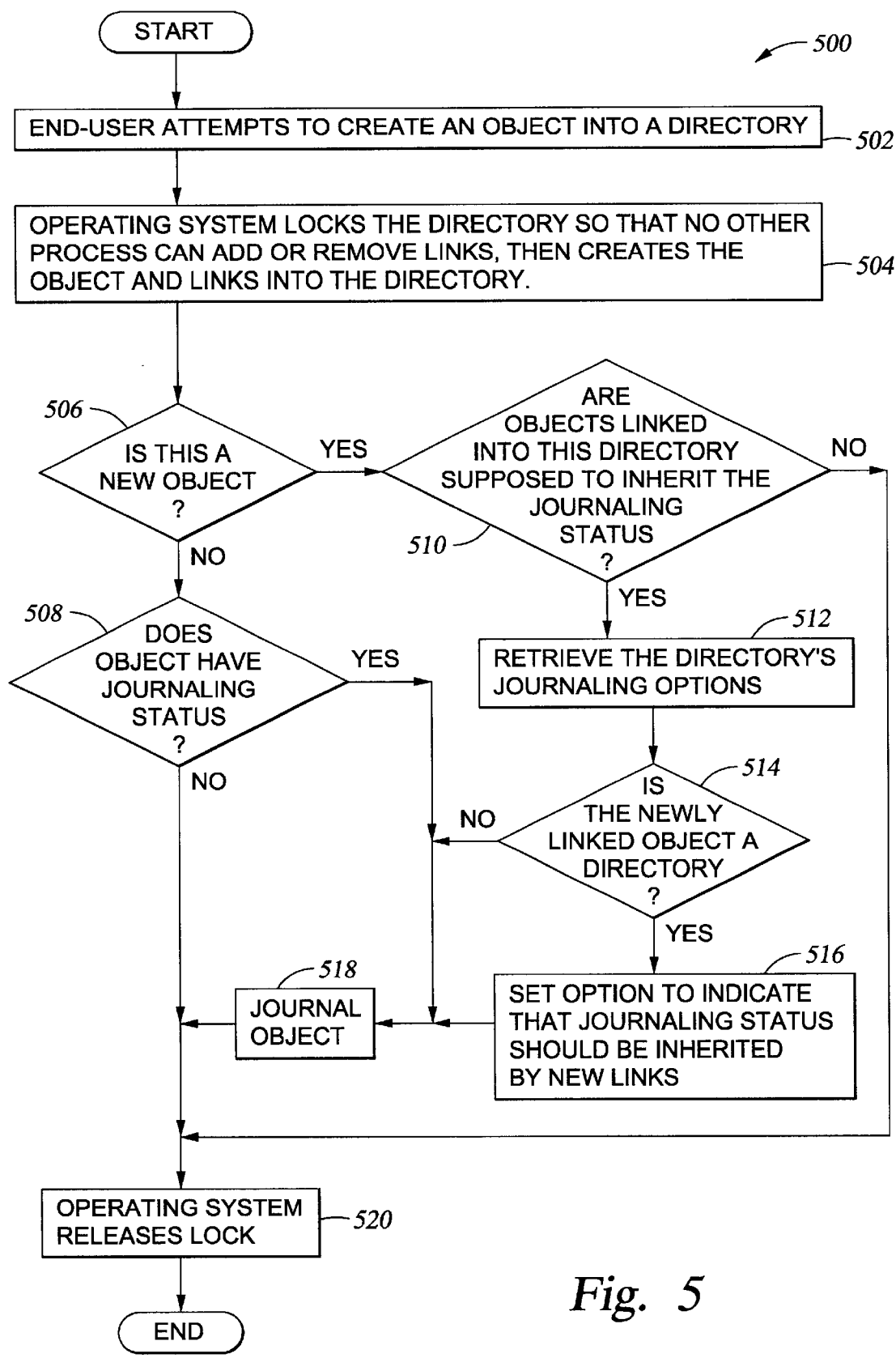
FIG. 5 is a flow chart illustrating the operation of inherit journaling status.

FIG. 5 shows a method 500 to journal an object whenever an application or a system user explicitly creates an object or modifies an existing object. In one embodiment, method 500 may be understood as an execution of inherit directory routine 57. In general, the method 500 executes whenever an application or a system user creates an object or modifies an existing object. For example, a user may create a directory object as a sub-directory to an existing directory, or creates or updates a data file. Or, for example, an application may create a data file object and link the data file object to an existing directory or it may modify any existing object. As an illustration, an object may be modified by changing the object name 62-1, or by adding revised data to a data file object.

The routine begins at step 502 where an end-user attempts to affect an object. As used herein, affecting means that a new object is submitted by, or an existing object is modified by, an end-user explicit operation or from an operation performed by an application.

At step 504, the operating system synchronizes with the file system to close a timing window where undesirable changes could have been made to the object by the operating system. Once synchronization is accomplished, the object is then created/modified in the directory.

At step 506, the routine queries if the object is a new object. If the answer is in the negative, the routine assumes that the object exists and that it has been modified in some way since its creation. The routine then proceeds to step 508. If answered in the affirmative, the routine proceeds to step 510.

At step 508, the routine queries if the existing object has inherit journal status. If answered in the negative, the routine proceeds to step 520. If answered in the affirmative, the routine proceeds to step 518.

At step 510, the routine queries if the directory that the object is to be linked is to inherit automatic journaling status. Automatic journaling status would be inherited if the directory was appended with the journaling attribute 62-2 (see FIG. 2). If, the answer is in the negative, the routine proceeds to step 520. If the response is in the affirmative, the routine proceeds on to step 512.

At step 512, the routine receives user preferred journaling options specified at the time when the directory was created. These options define how the directory's objects should be ordered. For example, the objects could be ordered in ascending or descending order according to their creation date or the objects could be ordered by their function.

At step 514, the routine queries if the submitted object is a directory object. If the answer is in the affirmative the routine then proceeds to step 516. At step 516, the routine appends the directory object with a journaling attribute 62-2 to indicate that all subsequent links into this directory shall have journaling started on their underlying object, if the underlying object was not journaled at the time that the link was added. The routine then proceeds to step 518. If step 514 is answered negatively, the routine would then proceed to step 518.

At step 518, the routine creates a record 61 for the object in the journal receiver 118. Upon creation of record 61 in journal receiver 118 (see FIGS. 2–3), the routine proceeds to step 520 where the operating system releases the synchronization link. The object may now be modified by the operating system.

Explicit Start Journaling

Figure 6:
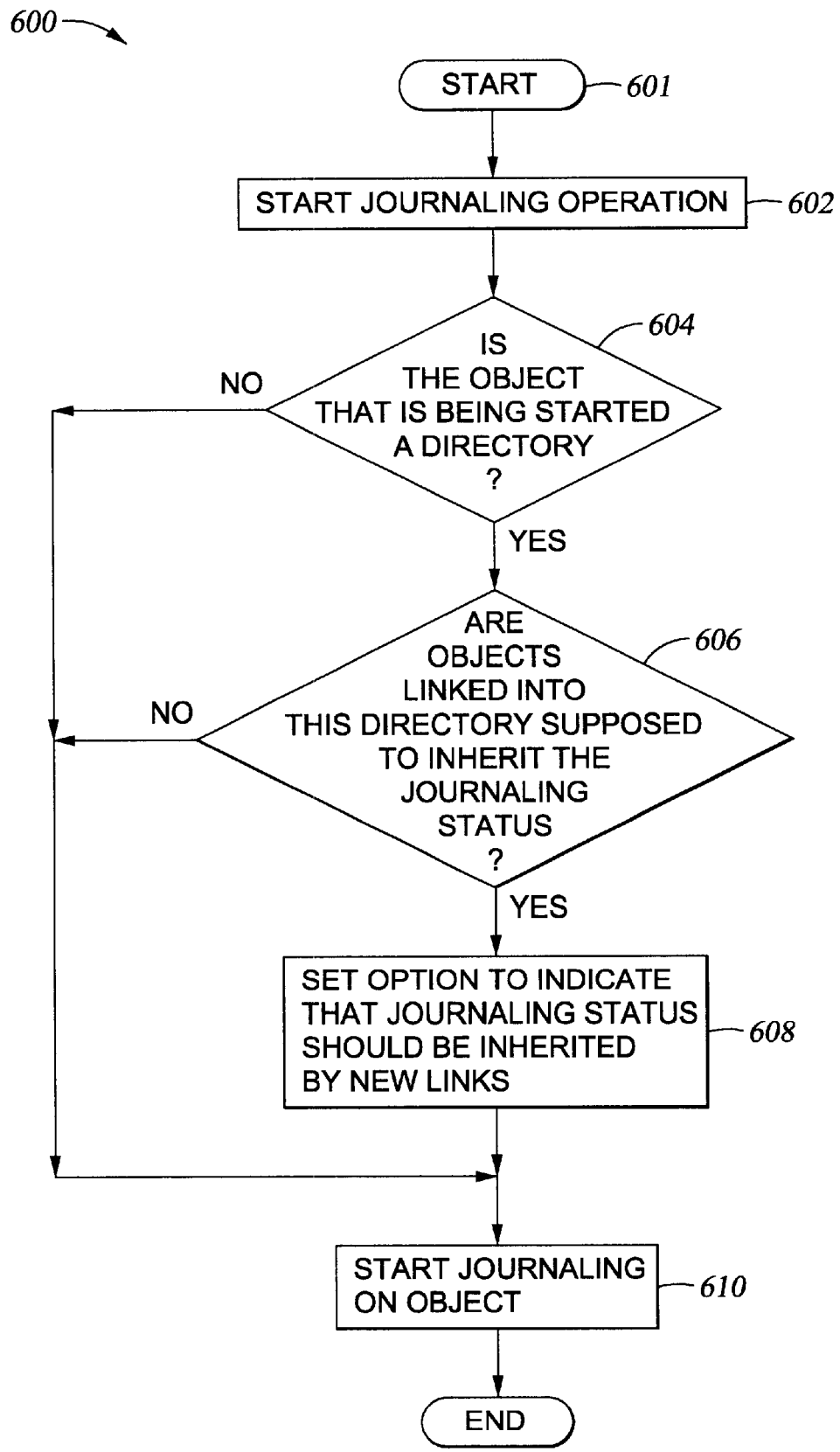
FIG. 6 is a flow chart illustrating the operation of explicit journaling status.

FIG. 6 depicts a flowchart of the explicit directory journal routine 600 embodiment. In general, this routine executes whenever an end user or end-user application sends a command to the file system to start journaling existing objects in the file system hierarchical tree structure.

The routine begins at step 601 where execution of a journaling operation is initiated. If the end-user is the manager of journaling operations on the system, then this step is invoked by the end-user entering a keyboard command or by selecting an icon from a graphical user interfaces (GUI), for example.

At step 602, the routine receives an object submitted by an end-user or application that manages journaling of objects on the computer system. During this step, the routine also identifies the object's user specified journaling features. Illustratively, the journaling features may be the identification and location of the object, identification and location of the journal receiver object that will be used to retain data and documentation for any changes to the object, and inclusion/omission of journaling changes that the system is providing as optional support. Optional support refers to a set of operations and corresponding journal entries that are not deemed critical with regard to the recoverability of journal objects. These types of optional entries typically do not cause object "changes" and may most often be used for auditing an object or for other information purposes. Examples of these types of optional journaled operations include opening a file, closing a file, or forcing a file out of memory to a storage medium.

At step 604, the routine queries if the object is a directory. If step 604 is answered affirmatively, the routine then proceeds to step 606. If step 604 is answered in the negative, the routine then proceeds to step 610.

At step 606, the routine queries if the directory object shall inherit journaling status. A directory shall inherit journaling attribute 62-2 if the directory is linked to an existing directory appended with journaling attribute 62-2. If the answer is in the affirmative, the routine proceeds to step 608. If answered in the negative, the routine proceeds to step 610.

At step 608, the routine appends the directory object with a computer-readable attribute indicating that the directory object shall inherit journaling status 62 from this point forward. At step 610, the routine creates a record 61 in the journal receiver 118 for the object.

While the foregoing is directed to the preferred embodiment of the present invention, other and further embodiments of the invention may be devised without departing from the basic scope thereof, and the scope thereof is determined by the claims that follow.

What is claimed is:

1. A method for journaling objects of a directory on a computer system, comprising:
   configuring a first directory with a journaling attribute indicating that journaling is to be automatically started for objects linked into the first directory;
   acquiring a synchronization lock;
   linking a second directory into the first directory;
   in response to linking the second directory, initiating journaling the second directory as required by the presence of the journaling attribute;
   inheriting by the second directory, the journaling attribute indicating that an object linked to the second directory is to be automatically journaled; and
   releasing the synchronization lock after journaling is started, whereby the synchronization lock prevents changes to the second directory before initiating the journaling.

2. The method of claim 1, wherein the first directory is a root directory and the second directory is associated with the root directory.

3. The method of claim 1, wherein journaling comprises writing object information to a journal log, wherein the object information indicates a manner in which the second directory was affected.

4. The method of claim 1, wherein journaling comprises:
   invoking an action of an operating system because of the presence of the journaling attribute; and
   writing to a journal log.

5. The method according to claim 1, wherein the first directory is a root directory and the second directory is associated with the root directory configured with the journaling attribute and wherein journaling comprises writing the second directory to a journal log.

6. The method of claim 1, wherein linking comprises linking the second directory to a directory object.

7. The method of claim 1, wherein the first directory is a hierarchical directory tree.

8. A data structure residing in memory, comprising a journaling attribute defined on a directory and causing automatic initiation of journaling of an object upon being linked into the directory, wherein the initiation of journaling is performed by an operation of an operating system configured to acquire a synchronization lock before the object is linked and hold the lock until after the journaling is initiated and wherein the journaling attribute is to be inherited by the object only if the object is a directory.

9. The data structure of claim 8, wherein the journaling attribute is a binary value, the binary value indicating that the object is to be journaled upon being linked to the data structure.

10. The data structure of claim 8, wherein the first directory is a hierarchical directory tree.

11. A signal bearing medium comprising a program which when executed by a processor, performs a method for journaling objects of a directory, comprising:

acquiring a synchronization lock;

linking a first directory into a second directory;

in response to linking the first directory, initiating journaling for the first directory if the second directory is configured with a journaling attribute;

inheriting by the first directory, the journaling attribute indicating that an object linked to the first directory is to be automatically journaled; and releasing the synchronization lock after journaling is started, whereby the synchronization lock prevents changes to the first directory before initiating the journaling.

12. The signal-bearing medium of claim 11, wherein the second directory is a root directory and the first directory is associated with the root directory.

13. The signal-bearing medium according to claim 11 wherein journaling comprises writing to a journal log.

14. The signal-bearing medium of claim 11, wherein journaling comprises:

invoking an action of an operating system because of the presence of the journaling attribute; and writing to a journal log.

15. The signal-bearing medium of claim 11, wherein the second directory is a root directory and the first directory is associated with the root directory configured with the journaling attribute and wherein journaling comprises writing the first directory to a journal log.

16. The signal-bearing medium according to claim 11, wherein linking comprises linking the first directory to a directory object.

17. The signal-bearing medium of claim 11, wherein the second directory is a hierarchical directory tree.

18. A method for automatically journaling directory objects associated with a root directory, comprising:

creating a new directory object;

in response to a request to create the new directory object, acquiring a synchronization lock;

linking the new directory object to an existing directory object configured with a journaling attribute configured to cause automatic initiation of journaling of objects linked into the existing directory object;

determining whether the new directory object is to inherit the journaling attribute configured to cause automatic initiation of journaling of objects linked to the new directory object; and if the new directory object is to inherit the journaling attribute;

associating the new directory object with an instance of the journaling attribute indicating that new objects subsequently linked into the new directory object will be automatically journaled;

initiating journaling of the new directory object; and releasing the lock after initiating the journaling.

19. The method of claim 18, wherein determining whether the new directory object is to inherit the journaling attribute comprises determining whether the existing directory object is configured with the journaling attribute.

20. The method of claim 18, wherein the root directory is a hierarchical directory tree.

* * * * *